Oct. 1, 1968 W. F. BARTLETT 3,404,237
TIME DIVISION MULTIPLEX RECIRCULATING STORAGE MEANS INCORPORATING COMMON HALF-ADDER
Original Filed June 26, 1964
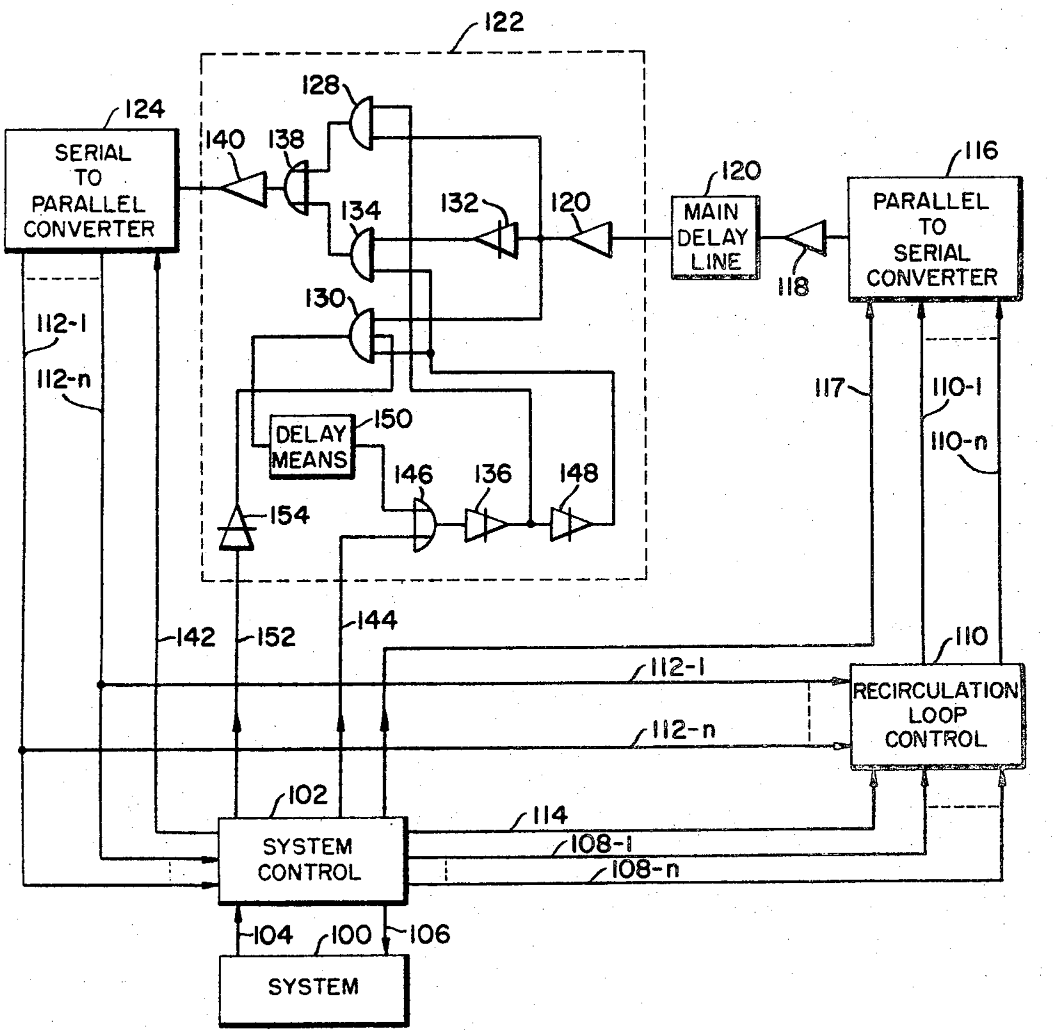
INVENTOR.
WILLIAM F. BARTLETT
BY George J. Seligsohn
ATTORNEY United States Patent Office 3,404,237

Patented Oct. 1, 1968

3,404,237

TIME DIVISION MULTIPLEX RECIRCULATING STORAGE MEANS INCORPORATING COMMON HALF-ADDER

William F. Bartlett, Rochester, N.Y., assignor to General Dynamics Corporation, Rochester, N.Y., a corporation of Delaware Continuation of application Ser. No. 378,225, June 26, 1964. This application Feb. 27, 1967, Ser. No. 619,524

4 Claims. (Cl. 179—15)

ABSTRACT OF THE DISCLOSURE

A recirculation loop apparatus is described for recirculating registration and counter storage information. The loop includes a parallel-to-serial converter, a serial-to-parallel converter, and a single common half-adder inserted between these converters at a position wherein the stored information is in serial form. The arrangement is such that multibit characters may be placed into counter storage without interfering with recirculation of any information which is placed in registration storage. The common half-adder applies a bit to be counted to the first-occurring time slot of a group of consecutively occurring time slots allocated to counter storage, with each time slot receiving a single bit. The carry output of the common half-adder is applied through a one bit delay gate to the input of the serial-to-parallel converter to provide serial storage of the built-up multibit character. The carry output is inhibited during the last occurring time slot of the group of consecutively occurring time slots allocated to counter storage so as to prevent the built-up character from extending into the time slots of the group which follows the group allocated to that multibit character.

This is a continuation of Ser. No. 378,225, filed June 26, 1964, and now abandoned.

This invention relates to a recirculation storage means for a time division multiplex system and, more particularly, to such means incorporating a common half-adder for making independent multiple counts.

Recirculation storage means for storing each of a plurality of multibit characters in parallel form or in serial form are well known in the art. See for example U.S. Patent No. 3,231,867 issued Jan. 25, 1966. In parallel form, a recirculation storage means includes a plurality of separate recirculation loops, equal to the number of binary bits composing a multibit character. The respective binary bits composing any given character are simultaneously applied to the respective recirculation loops in some one time slot of a repetitive time frame composed of a predetermined number of time slots. Each recirculating loop has a loop time delay equal to one time frame and may be composed of a delay line and recirculation means for coupling the output of the delay line back to the input thereof. Each recirculation means includes means for selectively opening or closing the loop during any time slot of any time frame, for selectively applying a binary bit from the system to the input of the delay means during any time slot of any time frame, and for selectively extracting a binary bit from the output of the delay means to be applied to the system during any time slot of any time frame. It will be seen that storage in parallel form directly provides at the same given time all the bits of an entire stored character at its output, which is an advantage. However, storage in parallel form necessitates a separate individual recirculation loop for each bit of a multibit character, which is a disadvantage.

Storage in serial form utilizes only a single recirculation loop, rather than the plurality of recirculation loops required by storage in parallel form, but, in the case of storage in serial form, each time frame is composed of successive groups of consecutive time slots, the respective binary bits composing any character occupying the consecutive time slots of some one of these groups. Therefore, for storage in serial form it is necessary to provide means, such as a tapped delay line, for converting the serially occurring binary bits to parallel form in order to use the information manifested thereby, and, then, converting this information in parallel form back to serial form, by means such as a tapped delay line, prior to being applied to the input of the main delay line of the recirculation loop. As the number of binary bits included in a multibit character becomes large, the added requirement of a serial-to-parallel converter and a parallel to-serial converter needed for serial storage is more than made up by the equipment serving in extra recirculation loops needed for parallel storage.

Some time division multiplex systems, such as a telephone time division multiplex system, require two different types of storage, namely, registration storage and counter storage. Registration storage is required, for instance, for storing the designation number of a calling subscriber in a telephone time division multiplex system, wherein that normally closed line gate coupling the line circuit of a particular calling subscriber to the common transmission highway is opened only during the particular time slot (in the case of storage in parallel form) or particular group of conservative time slots (in the case of storage in serial form) of each time frame occupied by the designation number of the particular calling subscriber. Counter storage is required, for instance, for determining each dialed digit of the designation number of a called subscriber, in response to the receipt of each time spaced pulse composing each dialed digit. Further, counter storage is required for counting the number of clock pulses which occur in the time interval between the occurrence of one time spaced pulse and the next time spaced pulse in order to determine whether this time interval represents an interpulse interval or an interdigital interval.

In the past, whether storage was in parallel form or in serial form, all operations on a character or number, other than storage per se, were performed when that character or number was in parallel form. Thus, when storage was in parallel form, the actual operation of counting took place after a number was read out from the output of the delay line and before the advanced number was reinserted into the input of the delay line. When storage was in serial form, the actual operation of counting took place after a read out number had been converted from serial-to-parallel form and before the advanced number had been converted from parallel back to serial form.

Therefore, it will be seen that regardless of whether storage was in parallel or serial form, actual counting took place when the number was in parallel form. This necessitated an individual half-adder to be utilized in the counting process for each respective binary bit included in a multibit character or number. It will be seen that when the multibit character or number was quite large, a large number of separate half-adders were required.

The present invention contemplates a modified serial type recirculating storage means, wherein a single common half-adder is inserted in the recirculation loop at a position thereof where the stored information is in serial form, i.e., either prior to its conversion from serial-to-parallel form or subsequent to its conversion back to serial from parallel form. This results in a very large saving in equipment and expense, particularly where the multibit character or number is large. Furthermore, the presence of this common half-adder in no way interferes with the recirculation of any information which is in registration storage, rather than counter storage.

It is, therefore, an object of the present invention to provide an improved serial type recirculating storage means incorporating a common half-adder for a time division multiplex system.

This and other objects, features and advantages of the present invention will become more apparent from the following detailed description, taken together with the accompanying drawing, in which the sole figure is a block diagram of a preferred embodiment of the invention.

Referring to the drawing, system 100, which may be a time division multiplex telephone system, supplies input information, such as whether a telephone is on-hook or off-hook, to system control 102 over input coupling 104 therebetween. Further, system control 102 applies control information, such as information to open particular normally closed line gates during particular time slots, to system 100 over output coupling 106 therebetween. Since the details of system 100 do not form any part of this information, it will not be further discussed herein.

System control 102 includes, among other things, a clock pulse source, counter means responsive to clock pulses for generating a repetitive time frame composed of a predetermined number of successive groups of a given number of consecutive time slots.

Certain groups of consecutively occuring time slots are reversed for information which is to be placed in registration storage, while the remaining groups of consecutively occurring time slots are reserved for information which is to be placed in counter storage. The respective binary bits of a character which is to be placed in registration storage are simultaneously applied by system control 102 through each of conductors 108–1 . . . **108–*n***, where *n* is equal to the number of binary bits in a character, to recirculation loop control 110 during a predetermined time slot of a particular time frame. Recirculation loop control 110 includes gating means for selectively coupling conductors 108–1 . . . **108–*n* to corresponding ones of conductors 110–1 . . . 110–*n* or for selectively coupling conductors 112–1 . . . 112–*n* to corresponding ones of conductors 110–1 . . . 110–*n*. The gating means of recirculation loop control 110 are selectively opened or closed in response to control information applied thereto from system control 102 over coupling 114** therebetween.

The gating means of recirculation loop control 110 are opened during the predetermined time slot of the aforesaid particular time frame to thereby simultaneously apply the respective binary bits of a character which is to be placed in registration storage to the input of parallel-to-serial converter 116 over the conductors 110–1 . . . **110–*n*. Parallel-to-serial converter 116 produces a serial stream of binary bits at its output which manifests a character to be placed in registration storage and which occur during the consecutive time slots of some particular one of the groups of consecutive time slots which are reserved for registration storage. More specifically, parallel-to-serial converter 116 may include individual normally closed AND gates each having a first input thereof coupled to each of conductors 110–1 . . . 110–*n* and a second input thereof connected in common to conductor 117, which applies an enabling signal from system control 102 during the predetermined time slot. The respective outputs of these AND gates are coupled to the taps of a tapped delay line included in parallel-to-serial converter 116**.

The information at the output of parallel-to-serial converter 116 is amplified by amplifier 118 and applied as an input to main delay line 120. Main delay line 120 produces an output therefrom in response to an input being applied thereto after a given time delay. The given time delay of main delay line 120 is somewhat less than one time frame.

As so far described, the embodiment of the present invention is identical to that conventionally used for serial type recirculating storage means. However, in the conventional type recirculating type storage means, the output of the main delay line, after being amplified, is applied directly to the input of a serial-to-parallel converter. In the present invention, on the other hand, counter circuit 122 incorporating a half-adder is inserted between the output of main delay line 120 and the input to serial-to-parallel converter 123. More specifically, the output of main delay line 120, after being amplified by amplifier 126, is applied directly as a first input to AND gates 128 and 130 and through inverter 132 as a first input to AND gate 134. AND gates 130 and 134 play no part as far as registration storage is concerned. However, AND gate 128 has a second input applied thereto from the output of inverter 136. This second input renders AND gate 128 normally enabled, so that in response to a pulse appearing at the output of main delay line 120 in any time slot, which pulse manifests a binary bit having a "one" value, a pulse will be produced at the output of AND gate 128, during that time slot, which output also manifests a binary bit having a "one" value. In response to an absence of a pulse at the main delay line 120 during any time slot, which absence of pulse manifests a binary bit having a "zero" value, an absence of a pulse will be produced at the output of AND gate 128, during that time slot, which output also manifests a binary bit having a "zero" value. The output of AND gate 128 is applied through OR gate 138 and amplifier 140 as an input to serial-to-parallel converter 124.

It will therefore be seen that insofar as bits of a character placed in registration storage are concerned, the insertion of counter circuit 122 in the recirculation loop is without effect, i.e., the information present at the output of main delay line 120 is presented without any change at the input to serial-to-parallel converter 124.

Serial-to-parallel converter 124 may include a tapped delay line as well as individual normally closed AND gates each having one input thereof coupled to each tap of the tapped delay line and the output thereof coupled to the input of a different individual bistable device. The normally closed AND gates have a second input coupled in common to conductor 142 which applies an enabling pulse to the AND gate during the time slot in which the first bit of the stream of binary bits composing the character placed in registration storage reaches the distal tap of the tapped delay line. This results in the character placed in registration storage being statically manifested by the respective outputs of the bistable devices. The respective outputs of the bistable devices of serial-to-parallel converter are individually applied through conductors 112–1 . . . **112–*n* to system control 102, where it is presented for utilization by the system, and to recirculation loop 110. During the aforesaid predetermined time slot of the time frame next occurring after a character to be placed in registration storage was originally applied to recirculation storage means, the gating means of recirculation loop control 110 in response to a control signal applied thereto from system control 102 over coupling 114 connects conductors 110–1 . . . 110–*n* to corresponding ones of conductors 112–1 . . . 112–*n* to thereby cause the character placed in registration storage to be recirculated. Each character placed in registration storage is recirculated in a similar manner during each successive time frame. Further, each character placed in registration storage is presented to system control 102 during the occurrence of that time interval of each successive time frame in which the binary bits of that character are present on conductors 112–1 . . . 112–*n*. It will be seen that the delay provided between the output of main delay line 120 and the input thereof is equal to the difference between one time frame and the delay provided by main delay line 120 itself. It will be further seen that as far as characters placed in registration storage are concerned, the embodiment of the present invention operates substantially identically with that of a conventional serial type recirculating type storage means, the only difference being that recirculating registration storage information must pass through counter circuit 122**, which has no effect thereupon.

However, in the case of information which is to be placed in counter storage, the embodiment of the present invention operates in a completely different manner than the conventional series type recirculating storage means. More specifically, in the case of information to be placed in counter storage, system control 102 selectively may apply or not apply a pulse to conductor 144 solely during the first-occurring time slot of any group of consecutive time slots reserved for counter storage during each successive time frame.

Assuming no previous pulse for a given group has been applied over conductor 144, the first pulse for that given group appearing on conductor 144 will be applied through OR gate 146 to the input of inverter 136 during the first-occurring time slot of the given group of some time frame. The output of inverter 136 will be applied both as a second input to AND gate 128 and as an input to inverter 148. The output of inverter 148 is applied as a second input to both AND gates 130 and 134. Since under the above assumption, at this time no pulse is present at the output of main delay line 120, neither AND gates 128 nor 130 will produce an output. However, the presence of inverter 132 will cause AND gate 134 to produce an output which will be applied to the recirculation loop through OR gate 138. Therefore, a pulse, manifesting a binary "one," will be inserted and then recirculated by the recirculating storage means of the present invention in the first-occurring time slot of the given group of consecutive time slots reserved for counter storage. This pulse will occur at the output of main delay line 120 during each subsequent time frame in this first-occurring time slot of this given group until system control 102 applies another pulse to conductor 144 in this first-occurring time slot of this given group. The presence of this second pulse on conductor 144 will result, in the manner previously described, in AND gate 128 being disabled by inverter 136 and AND gates 134 and 130 being enabled by inverter 148. However, the simultaneous presence of a pulse in main delay line 120 will result in the disablement of AND gate 134 by inverter 132 and the enablement of AND gate 130. Therefore, only AND gate 130 will produce an output pulse, which is a carry pulse. The output of AND gate 130 is delayed by delay means 150, which produces a delay equal to one time slot. This delayed pulse is applied through OR gate 146 during the second-occurring time slot of the given group and, in the manner previously described, causes an output to be produced by AND gate 134 during this second-occurring time slot of the given group which is applied to the recirculating storage means through OR gate 138. Since AND gates 128 and 134 were disabled during the first-occurring time slot of this given group, after the second pulse has been applied to conductor 144, no pulse is recirculated in the first-occurring time slot of the given group.

From the foregoing, it will be seen that the described elements of counter circuit 122 perform the functions of a half-adder in which the carry pulse output of AND gate 130, manifesting each higher order of the binary numerical character built up in the given group of consecutive time slots of the recirculating storage means, is delayed by one time slot with respect to the immediately lower order of this binary numerical character. This binary numerical character, as it is then constituted, is presented to system control 102 by serial-to-parallel converter 124 during each time frame.

Since each group of consecutive time slots is made up of only a given number of time slots, there is a limit in the number of bits, or the maximum value of the binary number, which can be placed in counter storage in the recirculating storage means. In order to insure that no binary numerical character having a value greater than this maximum value may be stored in the recirculation storage means, system control 102 applies a pulse over conductor 152 to the input of inverter 154 during the last occurring time slot of each group of consecutive time slots reserved for counter storage of each successive time frame. The presence of inverter 154 causes AND gate 130 to be normally partially enabled. However, AND gate 130 is disabled in response to each pulse applied from system control 102 to conductor 152. Therefore, AND gate 130 cannot produce an output during the last occurring time slot of any group of consecutive time slots reserved for counter storage. Thus, delay means 150 cannot apply a pulse to OR gate 146 during the time slot which occurs immediately thereafter, which time slot would, of course, be the first-occurring time slot of a next occurring group.

Although counter circuit 122 has been shown between the output of main delay line 120 and the input to serial-to-parallel converter 124 in the disclosed embodiment, it is clear to those skilled in the art that it could be placed with equal result between the output of parallel-to-serial converter 116 and the input to main delay line 120, although in this case the time of occurrence of pulses from system control 102 to conductors 144 and 152 would have to be adjusted to compensate for this change in position of counter circuit 122 in the recirculating storage loop.

Furthermore, it would be possible, although not too practical, to enter characters for registration storage serially during only one time frame over conductor 144, rather than in the conventional manner over conductors 108–1 . . . **108–*n***.

Therefore, it is not intended that the invention be restricted to the preferred embodiment disclosed herein, but that it be limited solely by the true spirit and scope of the appended claims.

What is claimed is:

1. In a time division multiplex system wherein a repetitive time frame is composed of a first group of successive occurring time slots which are reserved for registration information and a second group of successively occurring time slots which are reserved for counter storage information, said system including a recirculation loop having a parallel-to-serial converter coupled to a serial-to-parallel converter, the improvement comprising, (a) means for injecting into said loop registration information during said first group of time slots and counter information in the form of serially applied bits of information during said second group of time slots, (b) means responsive to said serially applied counter bits of information for building-up a multibit character in said second group of time slots, and (c) means for serially delivering said multibit character as an input to said serial-to-parallel converter, whereby said multibit character is circulated around said loop.

2. The invention as set forth in claim 1 wherein said responsive means comprises a common half-adder having carry means for building-up said multibit character.

3. The invention as set forth in claim 2 including means for inhibiting said carry means in the last occurring time slot of said second group of time slots to prevent said built-up character from extending into the time slots of the group which follows.

4. In a time division multiplex system wherein a repetitive time frame is composed of a plurality of successively occurring groups of consecutively occurring time slots, a recirculating storage loop having a loop time delay equal to one time frame, said loop comprising delay means for producing an output therefrom in response to an input being applied thereto after a given time delay, said given time delay being no greater than said loop time delay, and recirculation means coupling the output of said delay means to the input thereof for selectively applying a pulse occurring at the output of said delay means in any given time slot of any given time frame to the input of said delay means in said given time slot of the time frame next succeeding said given time frame after a time interval equal to the difference of said loop time delay and said given time delay, said recirculation means comprising first means, second means and third means, said first means including first binary logic means having first and second inputs and an output for producing a pulse at the output thereof during any given time slot of any time frame only in response to a pulse occurring in that given time slot being applied to solely either but not both of said first and second inputs thereof, normally enabled second binary logic means having first and second inputs and an output for producing a pulse at the output thereof during a time slot immediately following any given time slot of any time frame solely in response to respective pulses being simultaneously applied to both said first and second inputs thereof during said given time slot, coupling means for applying a pulse applied thereto as said first input of each of said first and second binary logic means, and means for applying the output pulse of said second binary logic means to said coupling means, said second means coupling the output of said delay means to said first and second binary logic means for successively applying each output pulse from said delay means occurring during the time slots of any time frame as said second input to each of said first and second binary logic means, said third means coupling the output of said first binary logic means to the input of said delay means to successively apply an output pulse from said first binary logic means occurring during any given time slot to the input of said delay means in that given time slot, and control means responsive to the occurrence of the consecutive time slots included in at least one predetermined group of each time frame coupled to said coupling means for selectively applying a pulse thereto during any time frame solely during the first-occurring one of said consecutive time slots included in any of said predetermined groups and coupled to said second binary logic means for disabling said second binary logic means during each successive time frame solely during the last occurring one of said consecutive time slots included in each of said predetermined groups.

No references cited.

ROBERT L. GRIFFIN, *Primary Examiner.*

W. S. FROMMER, *Assistant Examiner.*